United States Patent
Klassen

(10) Patent No.: US 6,498,868 B1
(45) Date of Patent: Dec. 24, 2002

(54) IMAGE SCALING USING PATTERN MATCHING TO SELECT AMONG SCALING ALGORITHMS

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/097,092

(22) Filed: Jun. 11, 1998

(51) Int. Cl.[7] .................. G06K 9/32; G06K 9/56; G06K 9/00; H04N 1/46; H04N 7/01
(52) U.S. Cl. .............. 382/298; 382/299; 382/205; 382/165; 382/164; 358/538; 358/448; 348/453
(58) Field of Search ................ 382/299, 298, 382/205, 270, 185, 181, 166, 109, 295, 293, 291, 282, 277, 201, 190, 164, 165; 358/448, 537; 348/450, 453; 11/538

(56) References Cited

U.S. PATENT DOCUMENTS

| | | | |
|---|---|---|---|
| 4,528,693 A | * 7/1985 | Pearson et al. | 382/47 |
| 5,073,962 A | * 12/1991 | Califano | 382/27 |
| 5,226,175 A | 7/1993 | Deutsch et al. | |
| 5,237,517 A | 8/1993 | Harrington et al. | |
| 5,267,328 A | * 11/1993 | Gouge | 382/16 |
| 5,325,477 A | 6/1994 | Klassen | |
| 5,426,723 A | 6/1995 | Horsley | |
| 5,485,563 A | 1/1996 | Fisher | |
| 5,517,437 A | 5/1996 | Yamashita et al. | |
| 5,517,612 A | 5/1996 | Dwin et al. | |
| 5,581,680 A | 12/1996 | Sfarti et al. | |
| 5,608,538 A | 3/1997 | Edgar et al. | |
| 5,608,853 A | 3/1997 | Dujari et al. | |
| 5,627,953 A | * 5/1997 | Yen | 395/139 |
| 5,635,967 A | 6/1997 | Klassen | |
| 5,644,406 A | 7/1997 | Harrington et al. | |
| 5,649,022 A | 7/1997 | Maeda et al. | |
| 5,651,107 A | 7/1997 | Frank et al. | |
| 5,682,249 A | 10/1997 | Harrington et al. | |
| 5,701,365 A | 12/1997 | Harrington et al. | |
| 5,778,106 A | * 7/1998 | Juenger et al. | 382/275 |
| 5,808,674 A | * 9/1998 | Adams, Jr. et al. | 348/273 |
| 5,838,838 A | * 11/1998 | Overton | 382/298 |

* cited by examiner

*Primary Examiner*—Bhavesh Mehta
*Assistant Examiner*—Yosef Kassa
(74) *Attorney, Agent, or Firm*—Fay, Sharpe, Fagan, Minnich & McKee, LLP

(57) ABSTRACT

A system for computing color information of a scaled version of a pixel of interest, includes a pixel identifier for identifying pixel color values for pixels in a neighborhood. The neighborhood includes the pixel of interest. The pixels in the neighborhood form a pattern. A transformer transforms the pixel color values of the pixel of interest and the plurality of neighboring pixels to produce a plurality of transformed values. A geometric pattern identifier identifies a geometric pattern which resembles the pattern formed by the pixels in the neighborhood. The geometric pattern is identified as a function of the transformed values. A selector selects an appropriate scaling algorithm to scale the geometric pattern. The algorithm produces the scaled version of the pixel of interest, along with the color information for the scaled pixel.

20 Claims, 3 Drawing Sheets

IMAGE SCALING USING PATTERN MATCHING TO SELECT AMONG SCALING ALGORITHMS

BACKGROUND OF THE INVENTION

The present invention relates to scaling (i.e., enlarging or reducing) color images. It finds particular application in conjunction with choosing an appropriate algorithm for scaling an antialiased original color image before it is combined with a new image, and will be described with particular reference thereto. It will be appreciated, however, that the invention will also find application for choosing a scaling algorithm for video images or other types of images.

The use of graphics in computer and communication applications is very widespread and is becoming increasingly more prevalent. A computing device often transmits a document including graphical data to a printing device using a page description language. Page description languages (e.g., the PostScript® language) include interpretive programming commands useful for implementing powerful graphics capabilities. When transmitted via a page description language, graphical data is typically first converted to a bit-map data file. Printing devices then include an interpreter for deciphering the bit-map data into raster graphics.

Recently, page description interpreters have begun to include means for antialiased images to be printed. In the context of gray-scale or black and white bit-map data, antialiasing refers to introducing intermediate intensity levels along edges of the object for smoothing jagged lines in lower resolution images. Similarly, in the context of color bit-map data, antialiasing refers to introducing a single color which is representative of various colors along the edges of an object to achieve the same effect in lower resolution color images.

Devices such as scanners and/or CCD cameras produce data which are similar to antialiased data. Data produced by those devices often includes optical blurring in intermediate values appearing along edges. The optical blurring provides the appearance of smoothness.

Because an antialiased image by definition is a gray-scale image, it is not possible to print an antialiased image directly on a black and white printer (i.e., a printer not capable of producing gray-scale images). Therefore, antialiased gray-scale images must first be converted to black and white (binary) images before they are printed to such printers. Typically, converting an antialiased image to a black and white image includes "scaling-up" the image.

One benefit of using antialiasing is that it reduces the total amount of data that must be computed and transmitted. As an example, assume a computer creates a 300 dot per inch ("dpi") by 300 dpi antialiased gray-scale image. The computer transmits the 300 dpi×300 dpi gray-scale image to a black and white printer (e.g., via a cable). The printer includes a scaling algorithm which scales-up the 300 dpi× 300 dpi gray-scale image to a 1200 dpi×1200 dpi image and subsequently converts it to black and white. Because the resulting 1200 dpi×1200 dpi image is black and white, it only has a single bit of data per pixel. The 300 dpi×300 dpi gray-scale image, on the other hand, has multiple (e.g., eight (8)) bits of data per pixel (i.e., one level of pixel data for each shade of gray). For each level of the 300 dpi×300 dpi gray-scale image, the 1200 dpi×1200 dpi black and white image has four (4) times as many pixels in each of the four (4) directions. In this sense, the 1200 dpi×1200 dpi black and white image appears to contain sixteen (16) times as much data. However, because the 1200 dpi×1200 dpi black and white image only contains one (1) bit per pixel and the 300 dpi×300 dpi gray-scale image contains eight (8) bits per pixel, the 1200 dpi×1200 dpi scaled-up image actually only contains two (2) times as much data.

In general, the cost of computing power necessary for manipulating data is at least proportional to the amount of data to be manipulated. Therefore, it is cheaper to manipulate data for lower resolution images. In the example described above, the lower resolution gray-scale image is stored and manipulated until the image is printed. Only at that time is the gray-scale image scaled-up to the black and white image. Consequently, a high resolution black and white image is produced using only about one-half of the computing power which would typically be required to achieve such an image. Similarly, that image may be transmitted using only one-half of the transmission bandwidth.

In addition to printing, there are other reasons for wanting to scale up an image, or some portion thereof. For example, it is often desirable to combine new image data with an existing image. Combining the images results in different pixel values for the final image. In this case, both images can be either gray-scale or color. Sharper images are produced when higher-resolution, as opposed to lower-resolution, images are combined. Therefore, it is desirable to scale-up an original antialiased image before it is combined with a second image.

One method of combining images is known as alpha-blending. For color images, alpha-blending uses the fractional coverage of the object contained in the new image to determine the fraction of the new color to be combined with the existing background (i.e., the original color). Alpha-blending assumes the background is a constant color. Specifically,:

$$I_{NEW} = I_{BACKGROUND} + \alpha(I_{OBJECT} - I_{BACKGROUND})$$

where $\alpha$ is the fraction of the pixel covered by the new object. While alpha-blending works for zero or full coverage, it is not reliable when a background object only partially covers a pixel.

FIGS. 1A, 1B and 1C illustrate three different high-resolution pixels representing edge geometries of a pixel in an original color image. Note that in FIGS. 1A, 1B and 1C only one-half of the original image covers the pixel. More specifically, one-half of the original pixel is solid cyan 2 while the other half of the pixel is solid white 3. FIG. 2 shows an image of the pixel after any one of the high-resolution pixels of FIGS. 1A, 1B, and 1C is antialiased. The antialiased pixel shown in FIG. 2 is represented by a shade 4 of cyan which is lighter than the original pixels shown in FIGS. 1A, 1B and 1C. As discussed above, one drawback of the weighted average technique of alpha-blending is that the geometry of the original image is lost when an image is antialiased. In other words, color distinctions along edges of the original image are lost. Therefore, if the antialiased original image is combined with a second image, correct colors may not be produced along edges of the resulting image.

FIGS. 3A, 3B and 3C illustrate the three high-resolution pixel geometries of FIGS. 1A, 1B and 1C, respectively, in which a new object having a solid magenta color 5 covering the right-half of the pixel is to be combined with the original cyan object. FIGS. 4A, 4B and 4C illustrate the correct rasterization which would result from alpha-blending the images of FIGS. 3A, 3B and 3C, respectively. More specifically, FIG. 3A illustrates a geometry having a left-half which is cyan 2 and a right-half which is magenta 5 (i.e., the new magenta 5 object does not cover any of the original cyan 2 object). FIG. 4A shows a dark purple pixel 6 results when the colors of FIG. 3A are blended correctly. FIG. 3B illustrates a geometry having a left-half which is white 3 and a right-half which is magenta 5 (i.e., the new magenta 5 object completely covers the original cyan object). FIG. 4B shows a pink pixel 7 results when the colors of FIG. 3B are blended correctly. FIG. 3C illustrates a geometry having a top left-half which is white 3, a bottom left-half which is cyan 2, and a right-half which is magenta 5 (i.e., the new magenta 5 object covers one-half ½ of the original cyan 2 object). FIG. 4C shows a light purple pixel 8 results when the colors of FIG. 3C are blended correctly.

As discussed above, because there is only a limited amount of memory on a computer, the high-resolution geometry of the original pixel (FIGS. 1A, 1B and 1C) is typically purged from memory once the original image is antialiased. Therefore, only the antialiased pixel (FIG. 2) is available to provide the geometry of the original object. Consequently, when it becomes desirable to combine the original object with a new object, it has been necessary in the past to assume an average case for which one of the three edge geometries shown in FIGS. 1A, 1B, and 1C accurately describe the geometry of the original object. As FIGS. 4A, 4B and 4C show, very different results are obtained for the final pixel depending upon which one of the three original geometries is chosen. Therefore, a noticeably incorrect result is produced for the final pixel when the average case is wrong as to the geometry of the edge pixel in the original image.

The present invention provides a new and improved apparatus and method which overcomes the above-referenced problems and others.

SUMMARY OF THE INVENTION

A method for computing color information of a scaled version of a pixel of interest includes identifying pixel color values for pixels in a neighborhood including the pixel of interest. The pixels in the neighborhood form a pattern. The pixel color values of the pixel of interest and the plurality of neighboring pixels are transformed to produce a plurality of transformed values. A geometric pattern, which resembles the pattern formed by the pixels in the neighborhood, is identified as a function of the transformed values. An appropriate scaling algorithm for scaling the geometric pattern is selected. The scaled version of the pixel of interest, along with the color information for the scaled pixel, is produced by applying the selected scaling algorithm to the pixel of interest.

In accordance with one aspect of the invention, a plurality of scaling algorithm identifiers are stored in a hash-table. The selecting step includes retrieving one of the scaling algorithm identifiers from the hash-table.

In accordance with a more limited aspect of the invention, as part of retrieving one of the scaling algorithm identifiers, an address is calculated where the identifier of the scaling algorithm is stored within the hash-table.

In accordance with a more limited aspect of the invention, the address is calculated as a modulus of a size of the hash-table and a multiple of a concatenation of at least one bit from the transformed values.

In accordance with another aspect of the invention, one of twelve geometric patterns are identified from a group including a flat geometric pattern, a northwest stroke geometric pattern, a northeast stroke geometric pattern, a vertical stroke geometric pattern, a horizontal stroke geometric pattern, a northwest edge geometric pattern, a northeast edge geometric pattern, a vertical edge geometric pattern, a horizontal edge geometric pattern, a corner geometric pattern, a cross geometric pattern, and an unknown geometric pattern.

One advantage of the present invention is that an appropriate algorithm is selected for scaling-up an image which has previously been antialiased.

Another advantage of the present invention is that when the scaled-up image is combined with a second image, correct rasterization is achieved along overlapping geometries such as edges, strokes, crosses, etc.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1A:
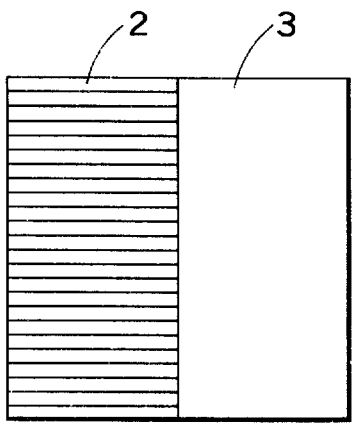
FIGS. 1A, 1B and 1C illustrate three different high-resolution pixels representing edge geometries of a pixel in an original color image.
Figure 1B:
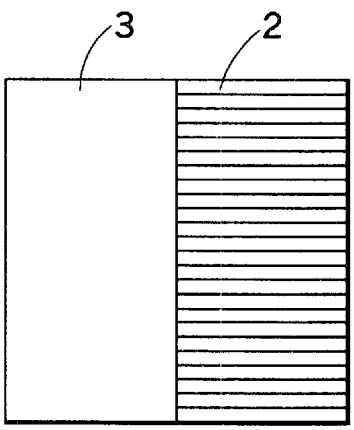
Figure 2:
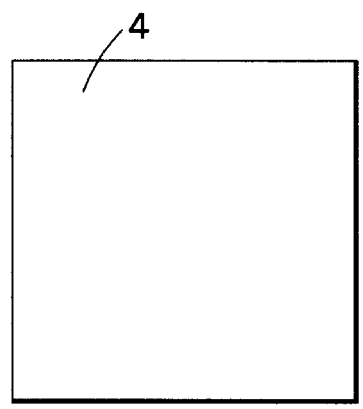
FIG. 2 illustrates an image of the pixel after any one of the high-resolution pixels of FIGS. 1A, 1B, and 1C is anti-aliased.
Figure 1C:
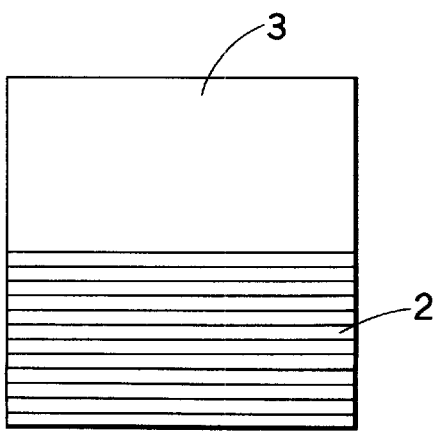
Figure 3A:
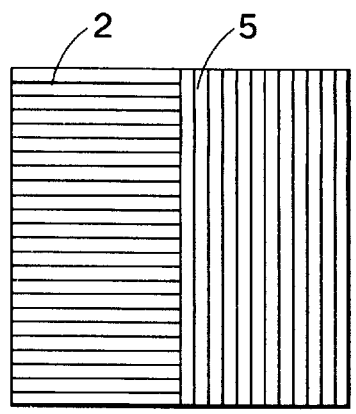
FIGS. 3A, 3B and 3C illustrate the three high-resolution pixel geometries of FIGS. 1A, 1B and 1C, respectively, in which a new object having a magenta color covering the right-half of the pixel is to be combined with the original cyan object.
Figure 4A:
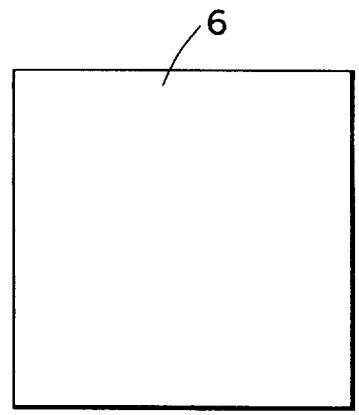
FIGS. 4A, 4B and 4C illustrate the correct rasterization which would result from alpha-blending the images of FIGS. 3A, 3B and 3C, respectively.
Figure 3B:
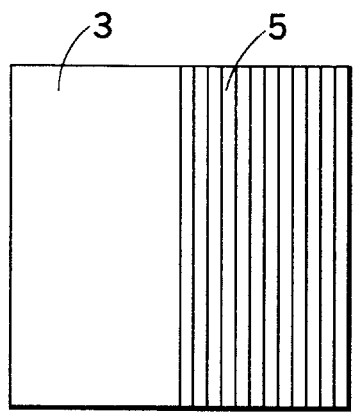
Figure 4B:
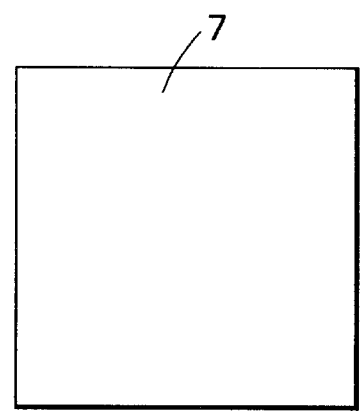
Figure 3C:
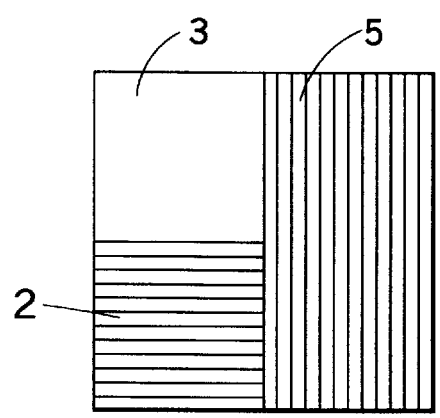
Figure 4C:
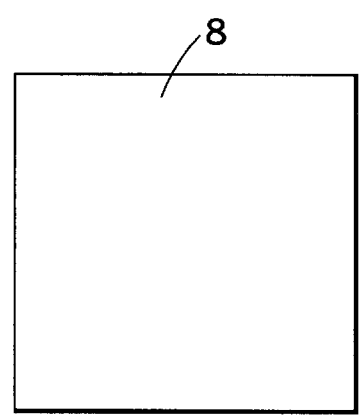
Figure 5:
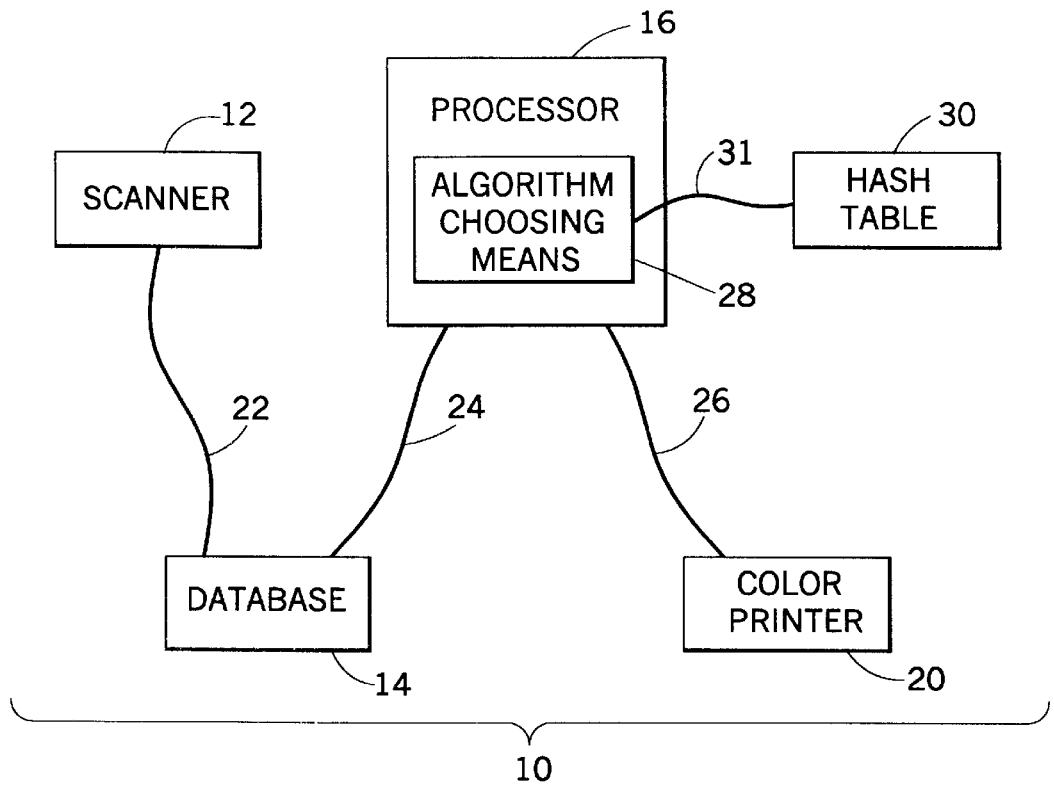
FIG. 5 illustrates an image manipulation system according to the present invention.

With reference to FIG. 5, an image manipulation system 10 includes a scanner 12, a database 14, a processor 16 and a color printer 20. Cables 22, 24, 26 connect the scanner 12 to the database 14, the database 14 to the processor 16, and the processor 16 to the color printer 20, respectively. The scanner 12 produces bit-map data representing an image. The bit-map data is electronically transferred via the cable 22 to the database 14, where it is stored as a data file. Although the image may be either black and white or color, the preferred embodiment will be described with reference to a color image. To print the image on the color printer 20, the processor 16 reads the bit-map data from the database 14.

Before printing the image, it frequently is desirable to scale one or more of the pixels within the image. The selected pixels are scaled independently of each other. The processor 16 includes a means 28 for choosing an appropriate algorithm to scale each selected pixel. As described below, the processor 16 accesses a hash-table 30, via a cable 31, in order to choose the appropriate algorithm to scale each selected pixel. Although the preferred embodiment describes scaling-up pixels within the image, it is to be understood that other embodiments which scale-down pixels within the image are also contemplated. Once the selected pixels have been scaled, the processor transfers the data to the color printer 20 via the cable 26. The color printer 20 produces a color image corresponding to the scaled data.

The first step in scaling a pixel is to decide how the pixel fit into the geometry of an object in the original image. More specifically, color values are determined for pixels in a 3×3 neighborhood containing the pixel of interest. The values corresponding to the colors for each of the nine (9) pixels in the 3×3 neighborhood are represented in a matrix A as:

$$A = \begin{bmatrix} a_{11} & a_{12} & a_{13} \\ a_{21} & a_{22} & a_{23} \\ a_{31} & a_{32} & a_{33} \end{bmatrix},$$

where $a_{22}$ represents the intensity of the pixel of interest.

Figure 6:
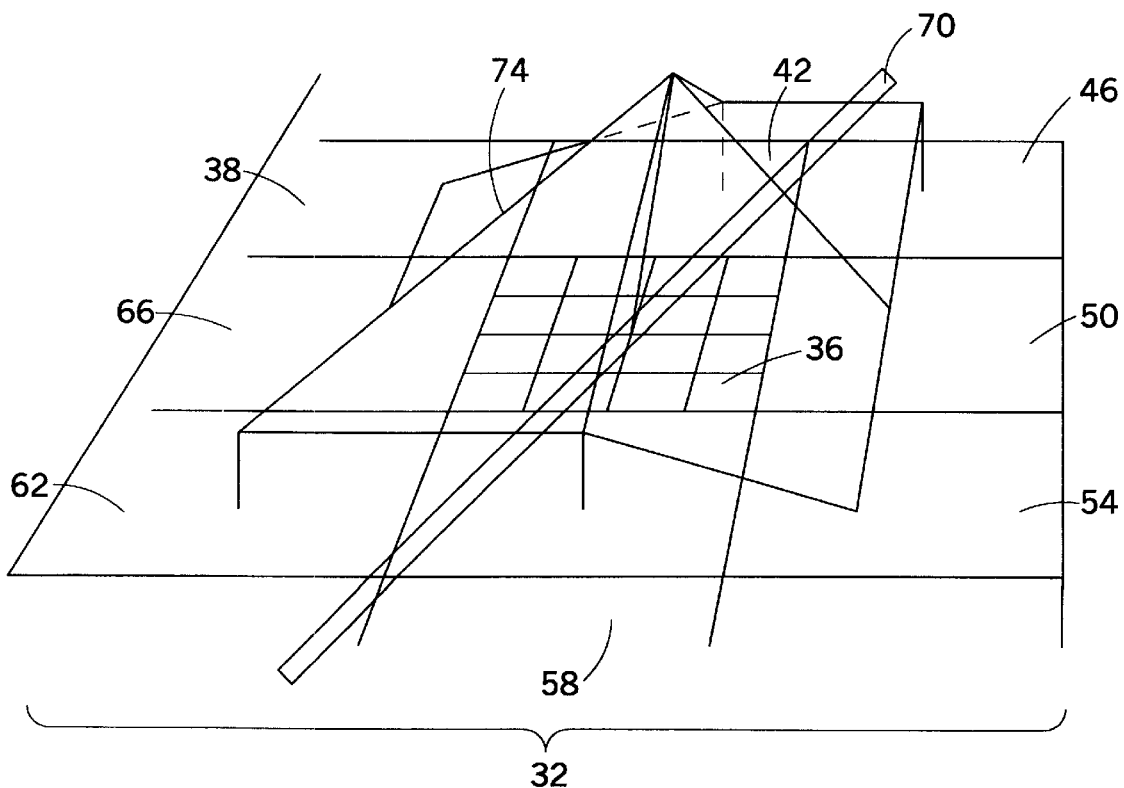
FIG. 6 illustrates a 3×3 neighborhood of pixels to be scaled-up according to the present invention.

As an example, FIG. 6 shows a 3×3 neighborhood 32 of pixels. A pixel of interest 36 is shown in the center. Additional pixels 38, 42, 46, 50, 54, 58, 62, 66 surround the pixel of interest 36. A northeast ("NE") stroke 70 is illustrated as passing from a vicinity of the southwest ("SW") (i.e., bottom, left) pixel 62 to NE (i.e., top, right) pixel 46 of the 3×3 neighborhood 32.

Values representing the intensity of the stroke 70 within respective pixels (i.e. an amount of the pixel covered by the stroke 70) are determined for the matrix A. A value of zero (0) indicates the stroke 70 does not pass through the pixel at all. A value of 200 indicates the stroke 70 completely passes through the pixel. A value of 100 indicates the stroke only partially passes through the pixel. For example, because the stroke 70 does not pass through the pixel 38, the value assigned to $a_{11}$ in the matrix A is zero (0). Because the stroke 70 partially passes through the pixels 42, 46, the value assigned to $a_{12}$ and $a_{13}$ in the matrix A is 100. Because the stroke 70 completely passes through the pixel of interest 36, the value assigned to $a_{22}$ in the matrix A is 200. The other values of the matrix A are assigned in a similar manner, thereby yielding:

$$A = \begin{bmatrix} 0 & 100 & 100 \\ 0 & 200 & 0 \\ 100 & 100 & 0 \end{bmatrix}.$$

In order to determine the geometry of the stroke 70, the matrix A is first transformed out of the spatial domain. There are various "transforms" known in the art. Common transforms include the Haar Basis Wavelet transform and the Discrete Cosine transform, e.g. used in the JPEG compression standard. These common transforms convert a block of image pixels from the spatial domain into the transform domain. Once in the transform domain, different elements of a block correspond to different features of the block. For example, one element may represent the average (i.e., D.C.) intensity value of the entire block while other elements represent various rates at which the intensity of the block is changing in different directions. In addition to their most common use in image compression, transformed blocks may be used for classification, which is how they will be used in the present invention. The transform used in the preferred embodiment of the present invention is described below. However, it is to be understood that other transforms are also contemplated.

During the transform, an intermediate matrix B is computed as:

$$B = \begin{bmatrix} \frac{4}{3}(a_{11}+a_{12}+a_{13}) & 2(a_{13}-a_{11}) & -a_{11}+2a_{12}-a_{13} \\ \frac{4}{3}(a_{21}+a_{22}+a_{23}) & 2(a_{23}-a_{21}) & -a_{21}+2a_{22}-a_{23} \\ \frac{4}{3}(a_{31}+a_{32}+a_{33}) & 2(a_{33}-a_{31}) & -a_{31}+2a_{32}-a_{33} \end{bmatrix} = \begin{bmatrix} b_{11} & b_{12} & b_{13} \\ b_{21} & b_{22} & b_{23} \\ b_{31} & b_{32} & b_{33} \end{bmatrix}.$$

Substituting the values for $a_{11} \ldots a_{33}$ from the matrix A yields:

$$B = \begin{bmatrix} \frac{4}{3}(200) & 2(100) & -0+200-100 \\ \frac{4}{3}(200) & 2(0) & -0+2(200)-0 \\ \frac{4}{3}(200) & 2(-100) & -100+2(100)-0 \end{bmatrix}.$$

The transformed values are computed from the intermediate matrix are represented in a matrix T as:

$$T = \begin{bmatrix} \frac{4}{3}(b_{11}+b_{21}+b_{31}) & 2(b_{31}-b_{11}) & -b_{11}+2b_{21}-b_{31} \\ \frac{4}{3}(b_{12}+b_{22}+b_{32}) & 2(b_{32}-b_{12}) & -b_{12}+2b_{22}-b_{32} \\ \frac{4}{3}(b_{13}+b_{23}+b_{33}) & 2(b_{33}-b_{13}) & -b_{13}+2b_{23}-b_{33} \end{bmatrix} = \begin{bmatrix} t_{11} & t_{12} & t_{13} \\ t_{21} & t_{22} & t_{23} \\ t_{31} & t_{32} & t_{33} \end{bmatrix}.$$

Substituting the values for $b_{11} \ldots b_{33}$ from the matrix B yields:

$$T = \begin{bmatrix} \frac{4}{3}\left(\frac{4}{3}(200)+300\right) & 0 & 0 \\ 0 & -400 & 0 \\ \frac{4}{3}(600) & 0 & 600 \end{bmatrix}.$$

An average intensity of the 3×3 neighborhood is represented by $t_{11}$. A first derivative of an intensity in a horizontal direction of the 3×3 neighborhood is represented by $t_{12}$. The horizontal first derivative is related to the slope of the intensity in the horizontal direction (i.e., the rate at which the intensity is changing in the horizontal direction). A first derivative of an intensity in a vertical direction of the 3×3 neighborhood is represented by $t_{21}$. The vertical first derivative is related to the slope of the intensity in the vertical direction (i.e., the rate at which the intensity is changing in the vertical direction). A combination of both the horizontal first derivative and the vertical first derivative is represented by $t_{22}$. Different combinations of second derivatives of the intensity of the 3×3 neighborhood in at least one of the horizontal direction and the vertical direction is represented by each of $t_{13}$, $t_{31}$, $t_{23}$, $t_{32}$, and $t_{33}$. Although the intermediate matrix B is used to simplify the computations for calculating the transform matrix T, it is to be understood that the expressions in the transform matrix T could be expanded to render the intermediate matrix B unnecessary.

It is to be noted that the term represented by $t_{11}$, the average intensity, is commonly called the DC term. Other terms (e.g., $t_{12}$, $t_{21}$, etc.), which represent the way the image varies within the block, are commonly called the AC terms. All of the information relevant to determining which, if any, pattern exists within the block of pixels is contained within the AC terms. Therefore, the present invention primarily focuses on utilizing the AC terms. However, the DC term is also used.

The high-order bit in any of the AC terms determines the sign of the respective feature of the pattern. Thus, for example, the high-order bit of $t_{12}$ determines whether, on average, the block becomes lighter or darker while progressing from, the left to the right side within the block. The remaining bits in the AC terms (progressing from the second highest bit to the low-order bit) provide increasingly precise information about the strength of the respective feature. For example, the bits beyond the highest-order bit of $t_{12}$ progressively define the degree to which the block becomes lighter or darker. Qualitatively, many different transforms (e.g. DCT, Haar Wavelet) behave in much the same way (i.e., one term of the transform specifies the average, or approximates the average, while other terms specify how rapidly the block is getting lighter or darker in one direction, etc.). While they differ in details, it is to be expected that many different transforms would perform similarly. The transform described in the preferred embodiment of the present application requires relatively few arithmetic operations. At the same time, the transform provides enough basic information related to the rates at which lightness/color change along with the rates at which those terms change.

The transform begins with nine (9) 8-bit values representing color information for the 3×3 neighborhood including the pixel of interest. These nine (9) values are transformed into nine (9) different values. More specifically, the transform uses 8-bit integer arithmetic to produce nine (9) 8-bit coefficients (i.e., 72 bits). One of these 8-bit coefficients, however, is irrelevant (i.e., the DC term). Therefore, the 64 bits in the remaining eight (8) coefficients are utilized to determine which of a finite number of predefined patterns is present in the neighborhood of pixels.

Preferably, only the top few bits of each of the eight (8) coefficients are used to determine the pattern. During the transform, the three (3) high-order bits from each of the eight (8) coefficients (i.e., $t_{12}$, $t_{13}$, $t_{21}$, $t_{22}$, $t_{23}$, $t_{31}$, $t_{32}$, $t_{33}$) in the matrix T are concatenated. The concatenated coefficients are then used as a key in a hash-table lookup. While the preferred embodiment discloses using three (3) high-order bits from eight (8) coefficients to determine a pattern in the block of pixels, it is to be understood that other embodiments using other combinations of the bits from the coefficients are also contemplated.

Hashing is a scheme whereby some arithmetic operations are applied to a key. The resulting value specifies an address at which the key, along with a corresponding value, are expected to be found in a hash-table. There are two common forms of hashing.

The first form of hashing is known as collision hashing. Collision hashing is useful when little is known about the set of keys. Specifically, collision hashing provides a rule to be followed when a key is not at the expected location (e.g., when another key exists at the expected location).

The second form of hashing is known as "perfect hashing". Perfect hashing is useful when an entire set of keys is known ab initio. Different sets of arithmetic operations are performed on the entire set of keys until an arithmetic operation is found which results in no collisions. In this manner, collisions are avoided. Perfect hashing has one significant advantage over collision hashing. Specifically, when a key in perfect hashing is not at an expected location (i.e., when another key appears at a resulting hash address), it can be concluded that the new key is not contained in the hash-table.

In the present invention, multiplying the key by a prime number and taking the result modulus the table size (which is also assumed to be a prime) provides perfect hashing, if the table size and multiplicative prime are chosen appropriately. Values for these numbers were determined empirically. Moreover, if the multiplier is one less than a power of two, a simpler formula may be used:

$$(key^{power}) - key.$$

The values found in the -hash-table 30 of the present invention are unique identifiers for different types of patterns and, hence, for a correct algorithm to scale the pixels forming the pattern. Therefore, the present invention selects a scaling algorithm based on a resulting value found in the hash-table 30.

Preferably, the hash-table 30 is constructed beforehand and merely used as a look-up table during the scaling-up process. The preferred means of constructing the hash-table 30 is to randomly generate a large number of known patterns having random parameters. Then, the transform of each pattern is calculated and converted to a hash key form. The frequency with which each hash key produces a specific pattern is tracked. An example of how the hash-table 30 is constructed is outlined below.

First, 3×3 images corresponding to various patterns of near-vertical strokes, having slopes randomly displaced from a perfectly vertical position, are generated. A small amount of noise is added to each image. The number of times each unique transform occurs for the images is then tabulated. This process is repeated for each of the other patterns (i.e., horizontal strokes, etc.). Once the process has been performed for all the patterns, the total number of times each pattern generates each transform is calculated. The pattern most likely to generate each transform is then determined from this information. In the preferred embodiment, approximately 1,000–1,500 unique transforms are generated from twelve (12) identifiable patterns.

The twelve (12) unique identifiable pattern types of the present invention, along with their descriptions, are listed in Table A. Although the preferred embodiment includes twelve (12) identifiable pattern types, it is to be understood that other embodiments including other numbers of identifiable pattern types are also contemplated.

TABLE A

| Pattern Type | Description |
| --- | --- |
| Flat | A pattern with little variation, identified by patterns with no non-zero AC terms in the transform. |
| NWStroke | A stroke, either light or dark, essentially from the lower right to the upper left. |
| NEStroke | A stroke, either light or dark, essentially from the lower left to the upper right. |
| VStroke | A vertical stroke. |
| HzStroke | A horizontal stroke. |
| NWEdge | An edge, dividing light from dark areas, where the two areas are in the bottom left and top right portions of the object. |

TABLE A-continued

| Pattern Type | Description |
| --- | --- |
| NEEdge | An edge, dividing light from dark areas, where the two areas are in the bottom right and top left portions of the object. |
| VEdge | An edge which is more vertical than diagonal. |
| HzEdge | An edge which is more horizontal than diagonal. |
| Corner | A joint between a horizontal edge and a vertical edge. |
| Cross | The combination of two strokes: either a northeast stroke and a northwest stroke, or a vertical stroke and a horizontal stroke. |
| Unknown | Any other pattern not identified above. |

A NWStroke, for example, sweeps through a 3×3 neighborhood of pixels at any one of several angles. The angle at which the NWStroke passes through the 3×3 neighborhood affects the hash-table address calculated from the transform matrix T. Therefore, the hash-table 30 is constructed to include multiple addresses which identify pixel geometries as a NWStroke. It is to be understood that the hash-table 30 also includes multiple addresses for each of the other pattern types identified in Table A. Once a specific pattern type is determined for a pixel of interest, the neighborhood of pixels are scaled-up according to an appropriate scaling algorithm. The scaling-up algorithms identified in Table A are described below.

If a flat geometry is identified, the pixel of interest is replicated within the 3×3 neighborhood to produce the color information of the scaled-up pixels.

If a stroke geometry is identified, it is assumed that there is either a light-dark-light or a dark-light-dark geometrical configuration. Therefore, once the orientation of the stroke is known, the corners of the 3×3 neighborhood containing the off-stroke and on-stroke colors are also known.

As an example, because a NEStroke is shown in FIG. 6, the NW and the SE corners (pixels) of the 3×3 neighborhood are chosen as the two pixels representing the off-stroke colors. The minimum intensity of the two off-stroke pixels (i.e., zero (0)) is assumed to give the best estimate of the off-stroke color. It is noted that in FIG. 6 the minimum intensity of both pixels in the NW and SE corners are zero (0). However, if the stroke was not exactly on center, these pixels could have different intensity values.

An initial estimate of the on-stroke color is 200. If the stroke is slightly narrower than the pixel, the intensity of 200 is assumed to be a blend between the off-stroke and on-stroke colors. The contrast between the off-stroke and on-stroke colors is increased. In the NEStroke shown in FIG. 6, the off-stroke color is already zero (0) and, therefore, cannot be made any lower. Consequently, in order to increase the contrast between the off-stroke color and the on-stroke color, the on-stroke color is increased, for example, to 255.

Next, a bi-linear equation is fit through the nine (9) pixels to form a bi-linear intensity surface 74. To fit the bi-linear equation, it is assumed that the scale of the 3×3 neighborhood is increased by a factor of four (4) in each direction. Consequently, the pixel of interest 36 becomes a 4×4 grid.

The intensity surface 74 is sampled at each of the sixteen (16) points (i.e., sub-pixels) within the 4×4 grid of the pixel of interest 36. Furthermore, it is assumed for the sake of the example that the values of 0, 100, and 200 correspond to values representing the intensities at the centers of each pixel. The center of each of the sixteen (16) sub-pixels is sampled to determine the surface value at that specific point. After the bi-linear surface 74 is sampled, the number of points of the high and the low color required to give the correct average color is computed. If the number of points of the low color is $n_{low}$, then the $n_{low}$ lowest points on the surface are assigned an intensity value of zero (0) and all the other points are assigned an intensity value of 225.

In general, if the average intensity of a 4×4 grid is assumed to be V, and the values A and B represent the high and low colors, respectively, within the grid, the equation:

$$Ax+B(16-x)=V$$

is used to determine how many of the pixels within the 4×4 grid are assigned the values of A and B. Once the value of x is calculated, it is rounded to the nearest integer. The highest "x" number of points within the 4×4 grid are assigned an intensity value of A while the remaining points are assigned a value of B.

If an edge geometry is identified, the algorithm for scaling-up the pixels is very similar to that used for a stroke geometry. However, the contrast for the edge geometry is not boosted. In the scaling-up algorithm for an edge geometry, the lightest and darkest intensities are assumed to be in the off-edge corners (the center pixel is ignored). The algorithm assigns pixels in the on-color edge a maximum intensity value and pixels in the off-color edge intensity values corresponding to the minimum of the two off-edge corners. After the intensity values of the pixels are assigned, the algorithm for scaling-up an edge is similar to the algorithm described above for scaling-up a stroke.

If a cross geometry is identified, the first step in the scaling-up algorithm compares the center pixel of the neighborhood with the mean (i.e., DC) value. This comparison is used to determine whether the pixels making up the cross are "light" or "dark". If a "dark" cross is detected, the pixel above and the pixel below the center pixel are each compared with the mean value. If both of those pixels are darker than the mean, it is assumed that the cross is "+" shaped. Otherwise, it is assumed the cross is "x" shaped. A similar procedure is used for determining the shape of a "light" cross. In this manner, one of four cross geometries is identified (i.e., a light "+" shaped cross, a light "x" shaped cross, a dark "+" shaped cross, or a dark "x" shaped cross).

For each of the four (4) identifiable cross geometries, a unique, fixed pattern is used. For example, if it is determined that the cross geometry includes a light "+" shaped cross, a pattern having a dark pixel at each of the four corners is used in the high resolution scaled-up block. In this manner, the high-resolution block is discriminated into light or dark regions in order to form the appropriate pattern. The two colors of the block are identified using the method described above for strokes. Although the lighter color is used for the light region, and the darker color is used for the dark region, it may be desirable to adjust the colors to keep the average color of the scaled-up block consistent with the original color.

If a corner geometry is identified, the scaling algorithm must further sub-classify the pixels to indicate which corner is contained in the presumed object and which corners are not. This case is specifically designed to handle the sharp corner of an axis-aligned rectangle (e.g., one corner passing somewhere through the pixel). Eight (8) unique sub-classifications are identifiable (i.e., light object vs. background, dark object vs. background; and for each of those two cases, an object in each of four corners of the pixel). The specific case is identified by comparing the possible background pixels to the mean for the entire block.

Due to the symmetry of the cases, only the case of a light object at the bottom right of the block is discussed further. In this case, the pixel to the right of the top-right pixel in the block, and the pixel below the bottom-left pixel in the block are also compared with the mean. If they are both darker than the mean, the block is scaled-up as a corner. Otherwise, it is treated as a north-east edge. Assuming the block is scaled-up as a corner, the crossing point of the vertical edge is calculated from the values of the bottom three pixels as:

$$\frac{1}{2} + \left(4 * \frac{bottom_{right} - bottom_{center}}{bottom_{right} - bottom_{left}}\right)$$

The crossing point of the horizontal edge is calculated in a similar manner. Finally, a rectangle is rasterized into the bottom right hand corner with edge positions as calculated above, and colors, as for an edge pattern.

If the geometry is unidentifiable, the present invention uses the scaling-up method disclosed in U.S. Pat. No. 5,701,365, which is hereby incorporated by reference.

The present invention provides a new way of identifying and applying different scaling algorithms to a digital image according to an initial estimate based on a neighborhood of pixels. The preferred, embodiment has been described with reference to scaling-up synthetically generated graphics, which are not accurately scaled by most other image scaling algorithms. However, it is also contemplated that the apparatus and method described in the present invention also be used to scale-up simple graphic images, complex graphic images, and pictorial images. Furthermore, it is also contemplated that the present invention be used to scale-down graphics for various reasons.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A method for computing color information of a scaled version of a pixel of interest, including:
   identifying pixel color values for pixels in a neighborhood including the pixel of interest, the pixels in the neighborhood forming a pattern;
   transforming the pixel color values of the pixel of interest and the plurality of neighboring pixels to produce a plurality of transformed values, respective ones of the transformed values representing an average color and color gradients of the pixels in the neighborhood;
   identifying, as a function of at least one of the transformed values, a geometric pattern which resembles the pattern formed by the pixels in the neighborhood;
   selecting an appropriate scaling algorithm for scaling the geometric pattern; and
   producing the scaled version of the pixel of interest, along with the color information for the scaled pixel, by applying the selected scaling algorithm to the pixel of interest.

2. The method for computing color information of a scaled version of a pixel of interest as set forth in claim 1, wherein the pixel color values include gray scale information, the method further including:
   storing a plurality of scaling algorithm identifiers in a hash-table;
   the selecting step including:
   retrieving one of the scaling algorithm identifiers from the hash-table.

3. The method for computing color information of a scaled version of a pixel of interest as set forth in claim 2, the retrieving step including:
   calculating an address where the identifier of the scaling algorithm is stored within the hash-table.

4. The method for computing color information of a scaled version of a pixel of interest as set forth in claim 3, the calculating step including:
   calculating the address as a modulus of a size of the hash-table and a multiple of a concatenation of at least one bit from the transformed values.

5. The method for computing color information of a scaled version of a pixel of interest as set forth in claim 1, wherein the identifying step includes:
   identifying a geometric pattern from a group including a flat geometric pattern, a northwest stroke geometric pattern, a northeast stroke geometric pattern, a vertical stroke geometric pattern, a horizontal stroke geometric pattern, a northwest edge geometric pattern, a northeast edge geometric pattern, a vertical edge geometric pattern, a horizontal edge geometric pattern, a corner geometric pattern, a cross geometric pattern, and an unknown geometric pattern.

6. The method for computing color information of a scaled version of a pixel of interest as set forth in claim 1, wherein the identifying step includes:
   identifying pixel color values for pixels in a 3×3 neighborhood.

7. The method for computing color information of a scaled version of a pixel of interest as set forth in claim 6, wherein the transforming step includes:
   representing the pixel color values corresponding to the pixels in the 3×3 neighborhood in a matrix A as:

$$A = \begin{bmatrix} a_{11} & a_{12} & a_{13} \\ a_{21} & a_{22} & a_{23} \\ a_{31} & a_{32} & a_{33} \end{bmatrix},$$

where $a_{22}$ represents the pixel color value for the pixel of interest;
computing an intermediate matrix B as:

$$B = \begin{bmatrix} \frac{4}{3}(a_{11} + a_{12} + a_{13}) & 2(a_{13} - a_{11}) & -a_{11} + 2a_{12} - a_{13} \\ \frac{4}{3}(a_{21} + a_{22} + a_{23}) & 2(a_{23} - a_{21}) & -a_{21} + 2a_{22} - a_{23} \\ \frac{4}{3}(a_{31} + a_{32} + a_{33}) & 2(a_{33} - a_{31}) & -a_{31} + 2a_{32} - a_{33} \end{bmatrix} = \begin{bmatrix} b_{11} & b_{12} & b_{13} \\ b_{21} & b_{22} & b_{23} \\ b_{31} & b_{32} & b_{33} \end{bmatrix}; \text{ and}$$

computing the transformed values represented in a transform matrix T as:

$$T = \begin{bmatrix} \frac{4}{3}(b_{11}+b_{21}+b_{31}) & 2(b_{31}-b_{11}) & -b_{11}+2b_{21}-b_{31} \\ \frac{4}{3}(b_{12}+b_{22}+b_{32}) & 2(b_{32}-b_{12}) & -b_{12}+2b_{22}-b_{32} \\ \frac{4}{3}(b_{13}+b_{23}+b_{33}) & 2(b_{33}-b_{13}) & -b_{13}+2b_{23}-b_{33} \end{bmatrix} = \begin{bmatrix} t_{11} & t_{12} & t_{13} \\ t_{21} & t_{22} & t_{23} \\ t_{31} & t_{32} & t_{33} \end{bmatrix},$$

where $t_{11}$ represents the average color of the pixel color values in the 3×3 neighborhood, $t_{12}$ represents a first derivative in a horizontal direction of the pixel color values in the 3×3 neighborhood, $t_{21}$ represents a first derivative in a vertical direction of the pixel color values in the 3×3 neighborhood, $t_{22}$ represents a combination of both the horizontal first derivative and the vertical first derivative of the pixel color values in the 3×3 neighborhood, and $t_{13}$, $t_{31}$, $t_{23}$, $t_{32}$, and $t_{33}$ each represents different combinations of second derivative of the pixel color values of the 3×3 neighborhood in at least one of the horizontal direction and the vertical direction.

8. The method for computing color information of a scaled version of a pixel of interest as set forth in claim 1, further including:
    printing the scaled version of the pixel of interest to a color printer.

9. The method for computing color information of a scaled version of a pixel of interest as set forth in claim 1, wherein the scaling algorithm scales-up the pixel, the producing step including:
    producing a scaled-up version of the pixel of interest, along with the color information for the scaled-up pixel, by applying the selected scaling-up algorithm to the pixel of interest.

10. A system for computing color information of a scaled version of a pixel of interest, including:
    a pixel identifier for identifying pixel color values for pixels in a neighborhood including the pixel of interest, the pixels in the neighborhood forming a pattern;
    a transformer for transforming the pixel color values of the pixel of interest and the plurality of neighboring pixels to produce a plurality of transformed values, respective ones of the transformed values representing an average color and color gradients of the pixels in the neighborhood;
    a geometric pattern identifier for identifying a geometric pattern which resembles the pattern formed by the pixels in the neighborhood, the geometric pattern being identified as a function of at least one of the transformed values; and
    a selector for selecting an appropriate scaling algorithm to scale the geometric pattern, the algorithm producing the scaled version of the pixel of interest, along with the color information for the scaled pixel.

11. The system for computing color information of a scaled version of a pixel of interest as set forth in claim 10, the system further including:
    a hash-table for storing the geometric pattern identifiers.

12. The system for computing color information of a scaled version of a pixel of interest as set forth in claim 11, wherein an address identifying a location of the geometric pattern identifier is a modulus of a size of the hash-table and a multiple of a concatenation of bits from at least one of the transformed values.

13. The system for computing color information of a scaled version of a pixel of interest as set forth in claim 10, wherein:
    the neighborhood including the pixel of interest is a 3×3 neighborhood containing nine (9) pixels.

14. The system for computing color information of a scaled version of a pixel of interest as set forth in claim 13, wherein:
    the pixel color values for each of the pixels in the 3×3 neighborhood is represented in a matrix A as:

$$A = \begin{bmatrix} a_{11} & a_{12} & a_{13} \\ a_{21} & a_{22} & a_{23} \\ a_{31} & a_{32} & a_{33} \end{bmatrix},$$

where $a_{22}$ represents the color information of the a pixel of interest;

an intermediate matrix B is computed as:

$$B = \begin{bmatrix} \frac{4}{3}(a_{11}+a_{12}+a_{13}) & 2(a_{13}-a_{11}) & -a_{11}+2a_{12}-a_{13} \\ \frac{4}{3}(a_{21}+a_{22}+a_{23}) & 2(a_{23}-a_{21}) & -a_{21}+2a_{22}-a_{23} \\ \frac{4}{3}(a_{31}+a_{32}+a_{33}) & 2(a_{33}-a_{31}) & -a_{31}+2a_{32}-a_{33} \end{bmatrix} = \begin{bmatrix} b_{11} & b_{12} & b_{13} \\ b_{21} & b_{22} & b_{23} \\ b_{31} & b_{32} & b_{33} \end{bmatrix}; \text{ and}$$

the transformed values are computed from the intermediate matrix and are represented in a matrix T as:

$$T = \begin{bmatrix} \frac{4}{3}(b_{11} + b_{21} + b_{31}) & 2(b_{31} - b_{11}) & -b_{11} + 2b_{21} - b_{31} \\ \frac{4}{3}(b_{12} + b_{22} + b_{32}) & 2(b_{32} - b_{12}) & -b_{12} + 2b_{22} - b_{32} \\ \frac{4}{3}(b_{13} + b_{23} + b_{33}) & 2(b_{33} - b_{13}) & -b_{13} + 2b_{23} - b_{33} \end{bmatrix} = \begin{bmatrix} t_{11} & t_{12} & t_{13} \\ t_{21} & t_{22} & t_{23} \\ t_{31} & t_{32} & t_{33} \end{bmatrix},$$

where $t_{11}$ represents the average color of the 3×3 neighborhood, $t_{12}$ represents a first derivative in a horizontal direction of the pixel color values in the 3×3 neighborhood, $t_{21}$ represents a first derivative in a vertical direction of the pixel color values in the 3×3 neighborhood, $t_{22}$ represents a combination of both the horizontal first derivative and the vertical first derivative of the pixel color values, and $t_{13}$, $t_{31}$, $t_{23}$, $t_{32}$, and $t_{33}$ each represents different combinations of second derivatives of the pixel color values in the 3×3 neighborhood in at least one of the horizontal direction and the vertical direction.

15. The system for computing color information of a scaled version of a pixel of interest as set forth in claim 10, wherein the scaling algorithm scales-up the pixel of interest.

16. The system for computing color information of a scaled version of a pixel of interest as set forth in claim 10, further including:

a color printer for printing the scaled pixel.

17. The system for computing color information of a scaled version of a pixel of interest as set forth in claim 10, further including:

a color facsimile machine for producing the scaled pixel.

18. A method for printing a scaled version of a pixel of interest, including:

identifying pixel color values for pixels in a neighborhood including the pixel of interest;

transforming the pixel color values of the pixels in the neighborhood to produce a plurality of transformed values, respective one of the transformed values representing an average color and color gradients of the pixels in the neighborhood;

identifying, as a function of at least one of the transformed values, a geometric pattern resembling a pattern formed by the pixels in the neighborhood;

selecting an appropriate scaling algorithm for scaling the geometric pattern;

producing the scaled version of the pixel of interest, along with the color information for the scaled pixel, by applying the selected scaling algorithm to the pixel of interest; and printing the scaled pixel along with the color information for the scaled pixel.

19. The method for printing a scaled version of a pixel of interest as set forth in claim 18, further including:

storing a plurality of scaling algorithm identifiers in a hash-table;

the selecting step including:

retrieving one of the scaling algorithm identifiers from the hash-table.

20. The method for printing a scaled version of a pixel of interest as set forth in claim 18, the producing step including:

producing a scaled-up version of the pixel of interest.

* * * * *